US011318337B2

(12) United States Patent
Diaz

(10) Patent No.: US 11,318,337 B2
(45) Date of Patent: May 3, 2022

(54) SYSTEMS AND METHODS FOR SUPPRESSING A FIRE CONDITION IN AN AIRCRAFT

(71) Applicant: The Boeing Company, Chicago, IL (US)

(72) Inventor: Derek T. Diaz, Chicago, IL (US)

(73) Assignee: The Boeing Company, Chicago, IL (US)

( * ) Notice: Subject to any disclaimer, the term of this patent is extended or adjusted under 35 U.S.C. 154(b) by 100 days.

(21) Appl. No.: 16/854,356

(22) Filed: Apr. 21, 2020

(65) Prior Publication Data

US 2021/0322810 A1    Oct. 21, 2021

(51) Int. Cl.
| A62C 35/13 | (2006.01) |
| A62C 3/08 | (2006.01) |
| A62C 35/02 | (2006.01) |
| A62C 37/38 | (2006.01) |
| A62C 35/68 | (2006.01) |
| A62C 35/64 | (2006.01) |
| A62C 99/00 | (2010.01) |
| A62C 37/36 | (2006.01) |
| B64D 45/00 | (2006.01) |

(52) U.S. Cl.
CPC ............. *A62C 35/13* (2013.01); *A62C 3/08* (2013.01); *A62C 35/023* (2013.01); *A62C 35/645* (2013.01); *A62C 35/68* (2013.01); *A62C 37/04* (2013.01); *A62C 37/38* (2013.01); *A62C 99/0018* (2013.01); *B64D 45/00* (2013.01); *B64D 2045/009* (2013.01)

(58) Field of Classification Search
CPC ......... A62C 35/13; A62C 3/08; A62C 35/023; A62C 35/645; A62C 35/68; A62C 37/04; A62C 37/38; A62C 99/0018; B64D 45/00; B64D 2045/009
USPC .......................................................... 169/62
See application file for complete search history.

(56) References Cited

U.S. PATENT DOCUMENTS

| 6,676,081 B2 * | 1/2004 | Grabow ................. A62C 3/08 |
| | | 169/46 |
| 8,733,463 B2 | 5/2014 | Meier |
| 8,925,642 B2 | 1/2015 | Meier et al. |
| 9,248,326 B2 | 2/2016 | Meier et al. |
| 9,919,169 B2 | 3/2018 | Lewinski et al. |
| 10,252,093 B2 | 4/2019 | Ransom |
| 2009/0038811 A1 | 2/2009 | Wagner |

(Continued)

*Primary Examiner* — Christopher S Kim
(74) *Attorney, Agent, or Firm* — McDonnell Boehnen Hulbert & Berghoff LLP

(57) ABSTRACT

An example system for suppressing a fire condition in an aircraft includes a supply of fire suppressant agent on-board the aircraft, a conduit coupled to the supply of fire suppressant agent and configured to carry fire suppression agent, an inlet located downstream of the conduit that is coupled to the conduit and is configured to be attached to a cargo container in the aircraft to deliver the fire suppression agent directly into the cargo container, a valve connected to the conduit between the supply of fire suppressant agent and the inlet, a detector located inside the cargo container, and a computer controller in communication with the valve and in communication with the detector, and controlling operation of the valve for delivery of the fire suppression agent into the cargo container based on an output received from the detector.

20 Claims, 9 Drawing Sheets

(56) References Cited

U.S. PATENT DOCUMENTS

| | | |
|---|---|---|
| 2010/0236796 A1 | 9/2010 | Chattaway et al. |
| 2011/0048747 A1 | 3/2011 | Gastonides et al. |
| 2012/0168184 A1 | 7/2012 | Enk, Sr. |
| 2012/0318537 A1 | 12/2012 | Ransom, Jr. |
| 2013/0000927 A1 | 1/2013 | Meier et al. |
| 2013/0120162 A1 | 5/2013 | Stehman et al. |
| 2014/0151072 A1 | 6/2014 | Stehman et al. |
| 2015/0075823 A1 | 3/2015 | Meier et al. |
| 2018/0022470 A1 | 1/2018 | Stehman et al. |

\* cited by examiner

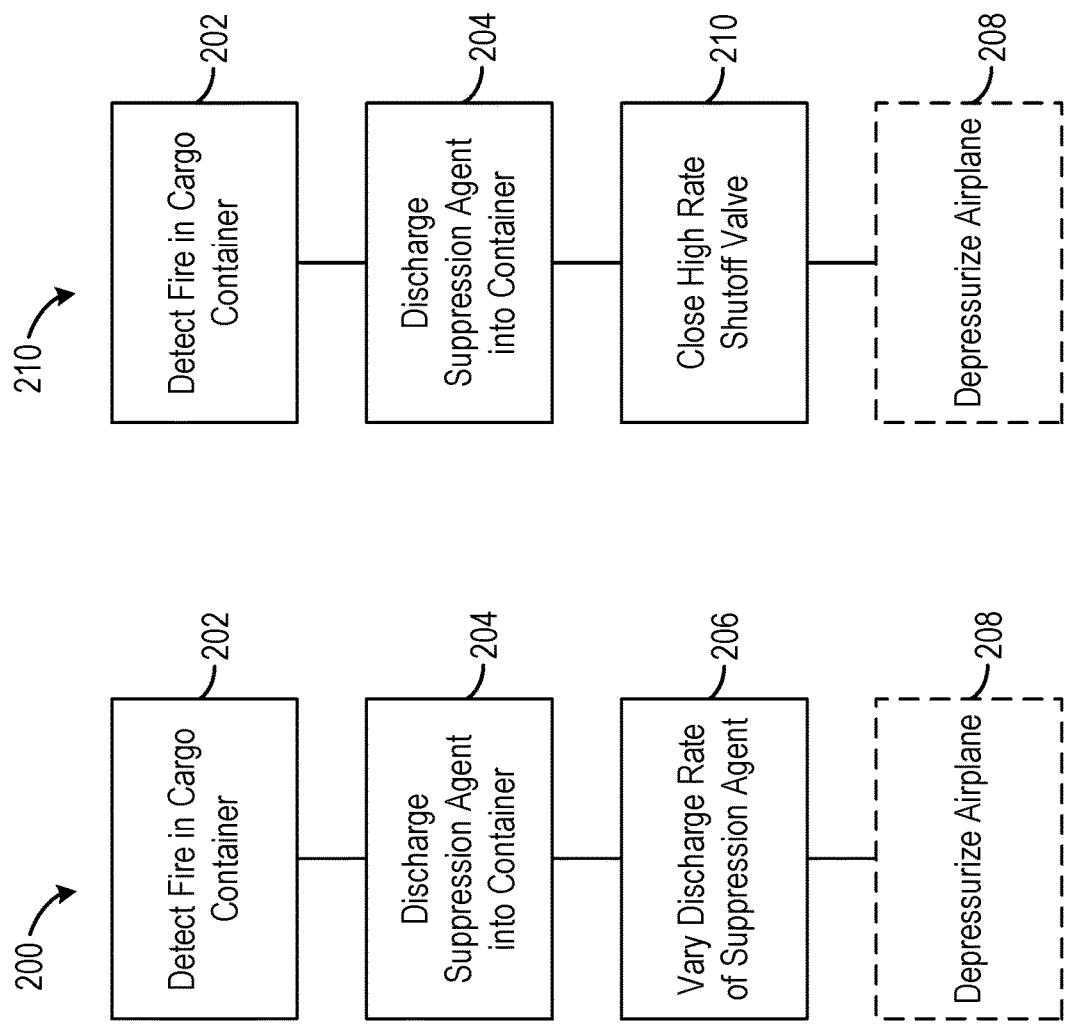

US 11,318,337 B2

SYSTEMS AND METHODS FOR SUPPRESSING A FIRE CONDITION IN AN AIRCRAFT

FIELD

The present disclosure relates generally to systems for suppressing a fire condition in an aircraft, and more particularly to, delivery of fire suppression agent directly into cargo containers in an on-demand basis.

BACKGROUND

The transportation of goods by vehicles, such as aircraft, requires protection systems to be installed in the vehicles. Although packaging and shipping requirements often include safety measures intended for safe carriage of goods, additional measures are intended to contain and control effects of a fire if a fire is started.

Existing protection systems often treat outside areas of containers of goods with fire suppressants or involve depressurization of the aircraft to reduce oxygen after a fire has been detected. Some other protection systems include self-contained fire suppressant systems inside containers or include mechanisms to puncture the containers and blow in foam.

SUMMARY

In an example, a system for suppressing a fire condition in an aircraft is described comprising a supply of fire suppressant agent on-board the aircraft, a conduit coupled to the supply of fire suppressant agent and configured to carry fire suppression agent, an inlet located downstream of the conduit and the inlet is coupled to the conduit and is configured to be attached to a cargo container in the aircraft to deliver the fire suppression agent directly into the cargo container, a valve connected to the conduit between the supply of fire suppressant agent and the inlet, a detector located inside the cargo container, and a computer controller in communication with the valve and in communication with the detector, and controlling operation of the valve for delivery of the fire suppression agent into the cargo container based on an output received from the detector.

In another example, a method for suppressing a fire condition in an aircraft is described comprising receiving, at a computer controller, an output from a detector located inside a cargo container in the aircraft, and by the computer controller, based on the output received from the detector, responsively controlling operation of a valve, which is connected to a conduit between a supply of fire suppressant agent on-board the aircraft and an inlet of the cargo container, for delivery of fire suppression agent through the conduit to the inlet and directly into the cargo container.

In another example, an aircraft is described comprising a cargo compartment configured to store a cargo container, and a system associated with the cargo compartment. The system comprises a supply of fire suppressant agent, a conduit coupled to the supply of fire suppressant agent and configured to carry fire suppression agent, an inlet located downstream of the conduit and the inlet is coupled to the conduit and the inlet is configured to be attached to the cargo container to deliver the fire suppression agent directly into the cargo container, a valve connected to the conduit between the supply of fire suppressant agent and the inlet, a detector located inside the cargo container, and a computer controller in communication with the valve and in communication with the detector, and controlling operation of the valve for delivery of the fire suppression agent into the cargo container based on an output received from the detector.

The features, functions, and advantages that have been discussed can be achieved independently in various examples or combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 8 illustrates an example method for suppressing a fire condition in an aircraft, according to example implementation.

FIG. 9 illustrates another example method for suppressing a fire condition in an aircraft, according to example implementation.

DETAILED DESCRIPTION

Disclosed examples will now be described more fully hereinafter with reference to the accompanying drawings, in which some, but not all of the disclosed examples are shown. Indeed, several different examples are described and should not be construed as limited to the examples set forth herein. Rather, these examples are described so that this disclosure will be thorough and complete and will fully convey the scope of the disclosure to those skilled in the art.

The systems and method described herein are configured to enable effective suppression of a fire inside a cargo container within the cargo compartment. The systems herein can enable fire reduction within transportation vehicles while allowing for full cargo transportation with fewer restrictions. Example systems and methods herein include an active fire suppression system that can effectively penetrate inside cargo containers within the cargo compartment. Discharge of a fire suppression agent directly into the cargo container can provide a more effective suppression of a fire within the container than discharge only around the container.

Moreover, within aircraft, depressurization of the aircraft can be used in combination with the active fire suppression system. Examples herein can include discharging a suppression agent directly into a cargo container before depressurization of the aircraft to immediately mitigate the fire condition.

Example systems and methods described herein also can utilize an aircraft's existing fire suppression agent to suppress a fire within a container in the cargo compartment. Doing so may reduce system weight, complexity, and cost.

Figure 1:
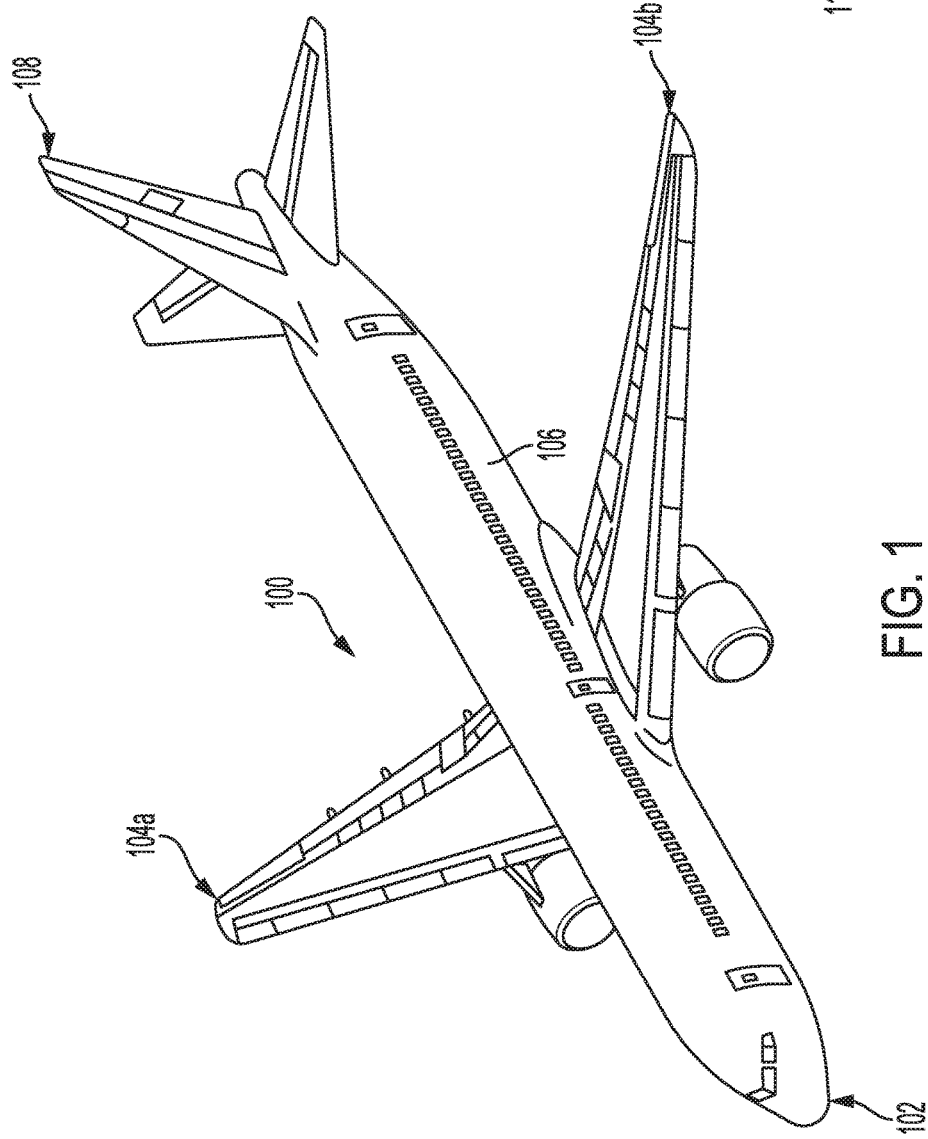
FIG. 1 illustrates an aircraft, according to an example implementation.

Referring now to the figures, FIG. 1 illustrates an aircraft 100 that includes a nose 102, wings 104a-b, a fuselage 106, and a tail 108, according to an example implementation. The aircraft 100 includes many areas arranged for storage of items during flight. In one example, the fuselage 106 includes storage underneath a passenger compartment for storing luggage and other items or supplies. In another example, the passenger compartment in the fuselage 106 includes overhead bins and under seat areas for storing further items. A cockpit compartment can also be defined in the fuselage 106 as being separate from the passenger compartment and/or the cargo compartment(s).

Figure 2:
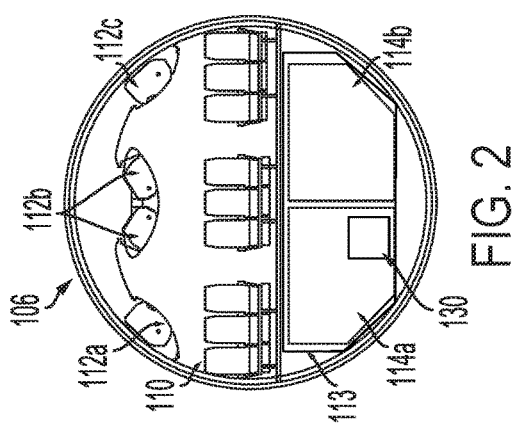
FIG. 2 illustrates a cross-sectional view of the fuselage looking aft, according to an example implementation.

FIG. 2 illustrates a cross-sectional view of the fuselage 106 looking aft, according to an example implementation. As mentioned above, the fuselage 106 has a passenger compartment including seating 110 for passengers. In the passenger compartment, baggage containers 112a-c (shown as overhead compartments or overhead bins) are included for storage. Typically, many overhead bins are included, such as one per row or one per multiple rows of the seating 110. The aircraft 100 includes a cargo compartment 113 and a system 120 (shown in FIG. 3). The system 120 is associated with the cargo compartment 113.

FIG. 2 also illustrates storage compartments or cargo compartment 113 underneath the passenger compartment. The one or more cargo compartments 113 are configured to store a cargo container(s) 114a-b. For example, when passengers check luggage and other items for travel, the luggage or other items are positioned in the cargo compartment 113 for travel. Other types of items can be positioned in the cargo compartment 113 as well. In FIG. 2, a package 130 is shown included in the cargo container 114a of the cargo compartment 113, as an example.

FIGS. 1-2 illustrate the aircraft 100 as a passenger aircraft. Other types of aircraft that do not include any passenger compartment, such as aircraft configured for cargo transport only, are also applicable to the present disclosure. In such aircraft, additional cargo compartments are included, such as replacing some or all of the seating 110 with one or more cargo compartments.

Within some examples, the aircraft 100 includes systems for suppressing a fire condition in the aircraft 100. Typical fire-suppression systems disperse an extinguishing agent (e.g., liquefied gas or compressed gas, atomized liquid spray, or a combination thereof) such as Halon 1211, Halon 1301, or combination thereof into the cargo compartment 113 to suppress a fire in those areas. In many instances, the systems are configured to release a rapid discharge of the extinguishing agent to provide a high concentration level of the agent to achieve a fast flame knockdown. For example, the rapid discharge is achieved by releasing the entire contents of one or more pressurized containers (e.g., bottles) of the agent into the cargo compartment 113.

Within examples described herein, the aircraft 100 includes a system for suppressing a fire condition in the aircraft 100, in which the system mitigates or exterminates a fire condition inside the cargo container 114a-b, rather than treating an outside of the cargo container 114a-b with fire suppressants dispersed inside the cargo compartment 113.

Figure 3:
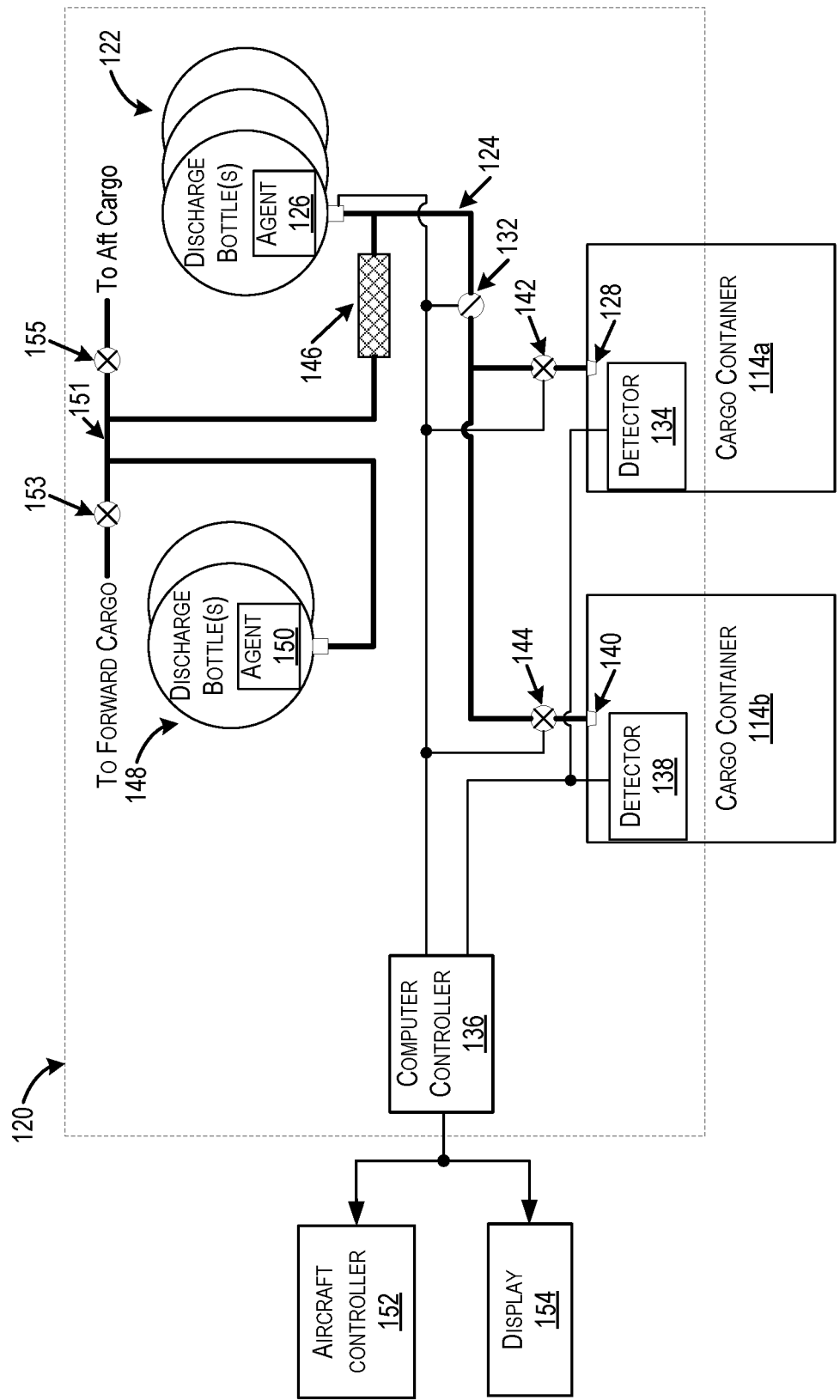
FIG. 3 illustrates a block diagram of a system for suppressing a fire condition in an aircraft, according to an example implementation.

FIG. 3 illustrates a block diagram of a system 120 for suppressing a fire condition in an aircraft, according to an example implementation. The system 120 is included on-board the aircraft 100.

The system 120 includes a supply 122 of fire suppressant agent on-board the aircraft 100, a conduit 124 coupled to the supply 122 of fire suppressant agent and configured to carry fire suppression agent 126, and an inlet 128 located downstream of the conduit 124 coupled to the conduit 124. The inlet 128 is configured to be attached to the cargo container 114a in the aircraft 100 to deliver the fire suppression agent 126 directly into the cargo container 114a. The system 120 also includes a valve 132 connected to the conduit 124 between the supply 122 of fire suppressant agent and the inlet 128, a detector 134 located inside the cargo container 114a, and a computer controller 136 in communication with the valve 132 and in communication with the detector 134. The computer controller 136 controls operation of the valve 132 for delivery of the fire suppression agent 126 into the cargo container 114a based on an output received from the detector 134.

Within some examples, more than one cargo container is included in the aircraft 100, and the aircraft 100 thus includes the cargo compartment 113 configured to store the cargo container 114b (or more than one cargo container) and the system 120 associated with the cargo compartment 113. In FIG. 3, the cargo container 114b is shown including its own detector 138 located inside, and the cargo container 114b also includes an inlet 140 to deliver the fire suppression agent 126 directly into the cargo container 114b. Additional valves 142 and 144 are included coupled to the conduit 124 proximal to the inlet 128 and the inlet 140 to control delivery of the fire suppression agent 126 into an appropriate cargo container.

Examples described below generally only refer to operation of the system 120 with respect to the cargo container 114a. However, the same operation applies to the cargo container 114b, and additional cargo containers if present.

The computer controller 136 is in communication with the valve 132, and also the valves 142 and 144, through electrical lines. The computer controller 136 is also in communication with the detector 134 and the detector 138 through separate electrical lines. The computer controller 136 is also in communication with discharge bottle squibs on the bottles of the supply 122 of fire suppressant agent. The computer controller 136 will provide power to fire the squib(s) based on a signal from a container detector. Although shown in FIG. 3 as two separate electrical lines, one electrical bus can be included in the system to which each valve and detector is coupled.

In FIG. 3, the supply 122 of fire suppressant agent is shown coupled to the conduit 124, and a filter/regulator 146 is included and coupled to the conduit 124 proximal the supply 122 to enable the fire suppression agent 126 to be routed to either forward or aft cargo, as well. For example, the supply 122 can be routed to either the forward or aft cargo depending on which of flow valves 153 and 155 are open or closed. A second supply 148 of fire suppression agent is further included for supplying additional fire suppression agent 150 to either forward or aft cargo. As shown, each of the supply 122 and 148 of fire suppression agent is coupled through conduit 151 as well. In this manner, although the supply 148 of fire suppression agent is dedicated for forward cargo, it can also be used for the aft cargo, whereas the supply 122 can be used for the forward or aft cargo.

The supply 148 is a high rate supply that is used for a rapid discharge of the extinguishing agent to provide a high concentration level of the agent to achieve a fast flame knockdown in either the forward or aft cargo depending on which of the flow valves 153 and 155 are open. The supply 122 is typically a low rate discharge routed through the filter/regulator 146 to meter a rate of the discharge so as to sustain a concentration level of the agent for an extended duration.

In some examples, the fire suppression agent 126 (and fire suppression agent 150) is a compressed gas. The fire suppression agent 126 can be the compressed or liquefied gas, or a combination thereof. The fire suppression agent 126 can include Halon in a liquefied, compressed gas form that stops spread of fire by chemically disrupting combustion. Halon 1211 (a liquid streaming agent) and Halon 1301 (a gaseous flooding agent) are examples of the fire suppression agent 126 that leave no residue and are safe for human exposure. In another example, the fire suppression agent 126 (and fire suppression agent 150) is not be purely a compressed gas, and rather, is a combination of liquid and compressed gas.

In some examples, the valve 132 is a shutoff valve configured to stop delivery of the fire suppression agent 126 through the conduit 124. In this example, the valve 132 can be turned on to allow delivery of the fire suppression agent 126 through the conduit 124, or turned off to stop delivery of the fire suppression agent 126 through the conduit 124.

In other examples, the valve 132 is a variable flow valve configured to vary a discharge rate of the fire suppression agent 126. In this example, the valve 132 can be controlled to meter an amount of the fire suppression agent 126 that is being delivered through the conduit 124.

Each of the valves 142 and 144 can also be shutoff valves or variable flow valves as well.

The detector 134 (and the detector 138) includes components to detect a fire condition is present inside the cargo containers 114*a-b*. Such components can include a heat detector (such as a temperature sensor) or a smoke detector (such as an ionization, photoelectric, or a combination of the two sensors). The computer controller 136 is in electrical communication with the detector 134 (and additional detectors in other cargo containers when present) to receive an output of the detector 134. The output of the detector 134 can be a signal indicative of presence of smoke, an elevated temperature, or a combination that would indicate a possible fire or a fire condition.

The computer controller 136 includes a processor and memory storing instructions executable by the processor to cause the computer controller 136 to perform functions described herein. Generally, the computer controller 136 controls operation of the valve 132 to discharge the fire suppression agent 126 in a cargo container once a fire is detected in the cargo container. The computer controller 136 receives the output from the detector 134, and based on the output, opens the valve 132 to discharge the fire suppression agent 126. As an example, the output is indicative of smoke above a threshold or a temperature above a threshold that are indicative of a fire condition, and thus, the valve 132 is opened. In another example, the detector 134 only provides the output to the computer controller 136 when there is smoke in the cargo container 114*a* above a threshold or temperature in the cargo container 114*a* above a threshold that is indicative of a fire condition, and thus, receipt of the output at the computer controller 136 is used as a trigger to open the valve 132.

The computer controller 136 controls operation of the valve 132 to provide a continuous discharge of the fire suppression agent 126 into the cargo container 114*a* (or the cargo container 114*b* as needed) until the supply 122 of fire suppression agent is substantially empty. The discharge can be a single, continuous discharge so that all of the fire suppression agent 126 is utilized.

Within examples, the supply 122 of fire suppressant agent is pressurized and valve 132 is a variable flow valve configured to vary a discharge rate of the fire suppression agent 126. The discharge rate is varied based on an amount of opening of the variable flow valve to relieve pressure of the supply 122 of fire suppression agent. In an example operation, the computer controller 136 controls operation of the variable flow valve to provide delivery of the fire suppression agent 126 at a first discharge rate for a first time period, and then to provide delivery of the fire suppression agent 126 at a second discharge rate until the supply 122 of fire suppression agent is substantially empty. To change the discharge rates, the computer controller 136 uses the valve 132 to meter the flow of the fire suppression agent 126. The first discharge rate is greater than the second discharge rate, so that initially the cargo container 114*a* is flooded at a high rate with the fire suppression agent 126, and the fire condition usually is mitigated at which time the valve 132 is metered to discharge the fire suppression agent 126 at a lower rate for a remainder of time until the supply 122 runs out.

Thus, the computer controller 136 controls operation of valves in the system 120 to vary discharge rate of the fire suppression agent 126 over time. Variation of the discharge rate can be based on a volume of the cargo container 114*a-b* and leakage rate, a cabin altitude, a type of fire suppression agent used, and the output of the detector 134/138. As an example, based on an output of the detector 134/138 being a temperature signal and the temperature exceeding a high threshold indicating a possible fire in the cargo container 114*a-b*, a higher discharge rate is utilized.

In FIG. 3, the computer controller 136 is shown in further communication with an aircraft controller 152 and a display 154. The display 154 is in a crew area and visible to a pilot to provide information with respect to operation of the system 120, for example.

The aircraft controller 152 is a separate controller configured to operate other systems of the aircraft. In one example, the computer controller 136 is a first computer controller, and the system 120 also includes a second computer controller (e.g., the aircraft controller 152) for causing depressurization of one or more compartments of the aircraft 100 after the first computer controller causes delivery of the fire suppression agent 126 into the cargo container 114*a*. Depressurization further helps to reduce or eliminate a fire by shutting off airflow to the cargo compartment 113 and reducing available oxygen to slow combustion.

The second computer controller (e.g., the aircraft controller 152) receives an input from crew or a pilot to manually activate depressurization of a compartment of the aircraft 100. The aircraft controller 152 can receive outputs from the computer controller 136, however, to indicate that a fire condition is present. The aircraft controller 152 then alerts crew or the pilot and provide an indication or recommendation to manually cause depressurization of the one or more compartments of the aircraft 100. As a result, the depressurization would occur after the delivery of the fire suppression agent 126 into the cargo container 114a, which is a first mitigation attempt for suppressing the fire.

In addition, the depressurization occurs only in a certain compartment(s) in some examples. In other examples, the entire aircraft is depressurized to suppress the fire.

Figure 4:
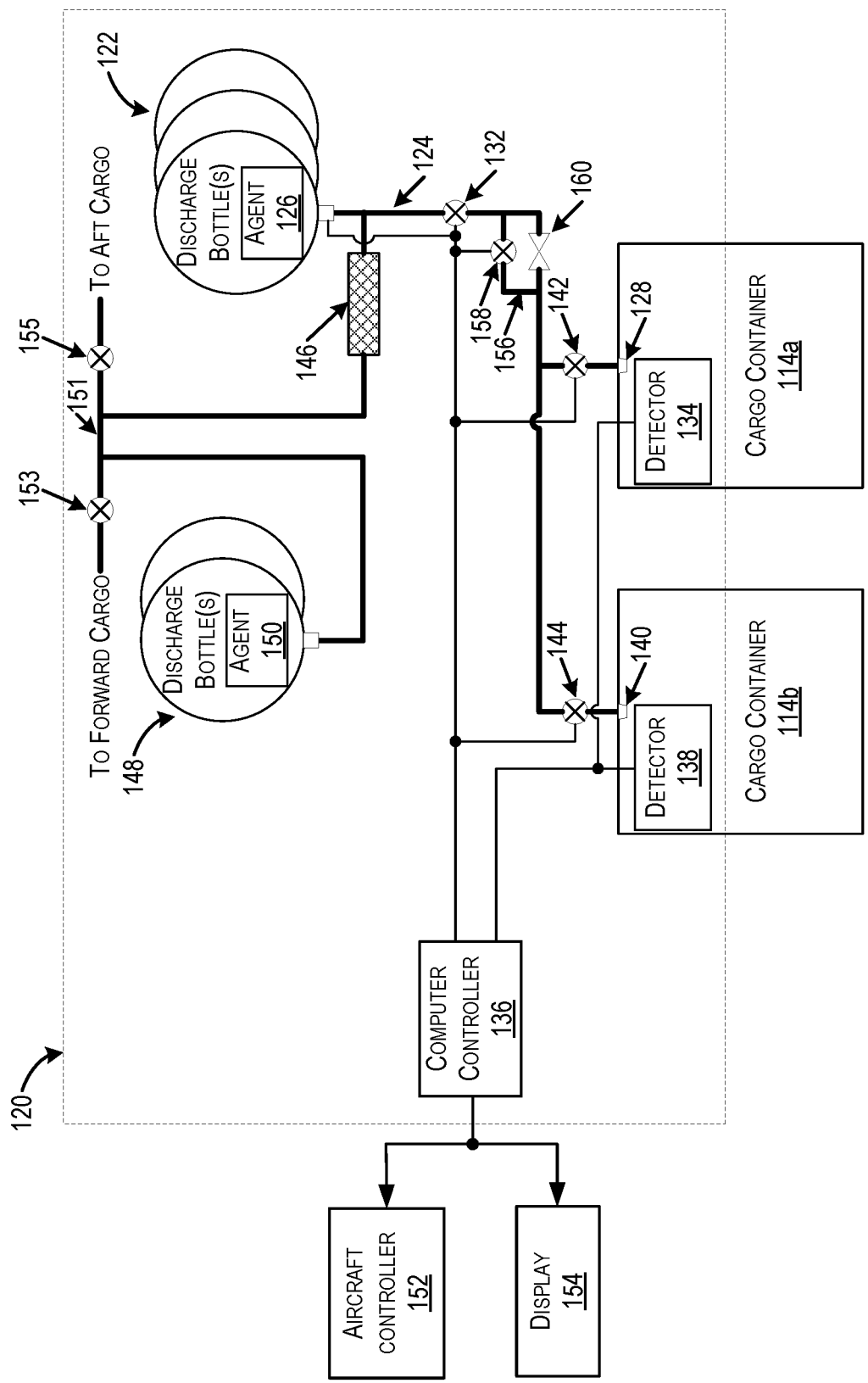
FIG. 4 illustrates a block diagram of another example of the system for suppressing a fire condition in an aircraft, according to an example implementation.

FIG. 4 illustrates a block diagram of another example of the system 120 for suppressing a fire condition in an aircraft, according to an example implementation. In FIG. 4, the system 120 is similar to the example shown in FIG. 3, except with the addition of a bypass conduit 156, a shutoff valve 158, and a restricting device 160.

The bypass conduit 156 enables an alternate way to vary a discharge rate of the fire suppression agent 126. For example, the bypass conduit 156 is coupled to the supply 122 of fire suppressant agent and is configured to carry the fire suppression agent 126, and the inlet 128 is further coupled to the bypass conduit 156 so that the fire suppression agent 126 is delivered directly into the cargo container 114a. The shutoff valve 158 is connected to the bypass conduit 156 between the supply 122 of fire suppressant agent and the inlet 128 to stop delivery of the fire suppression agent 126 through the bypass conduit 156 after a given period of time.

In an example operation, the computer controller 136 controls operation of the shutoff valve 158 (and the valve 132) to provide delivery of the fire suppression agent 126 at a first discharge rate for a first time period through the bypass conduit 156, and then closes the shutoff valve 158 after the first time period. The computer controller 136 then controls operation of the valve 132 to remain open and provide delivery of the fire suppression agent 126 at a second discharge rate (through the restricting device 160) until the supply 122 of fire suppression agent is substantially empty, and the first discharge rate is greater than the second discharge rate. The second discharge rate is further controlled by the restricting device 160 that meters flow of the fire suppression agent 126 as well.

Thus, when the shutoff valve 158 is open, there are two pathways for the fire suppression agent 126 from the supply 122 into the cargo container 114a. A first pathway is through the bypass conduit 156, and a second pathway is through the restricting device 160. A majority of the flow of the fire suppression agent 126 will be through the bypass conduit 156 due to no restrictions. A discharge rate then will be controlled by a level of pressure of pre-pressurized bottles containing the fire suppression agent 126. Once the shutoff valve 158 is closed, the fire suppression agent 126 will flow through the restricting device 160 to be discharged at a lower rate for a remainder of time until the supply 122 runs out. The first discharge rate is considered a high rate to flood the cargo container 114a with the fire suppression agent 126, and the second discharge rate is considered a low rate to maintain concentration of the fire suppression agent 126 in the cargo container 114a.

Figure 5:
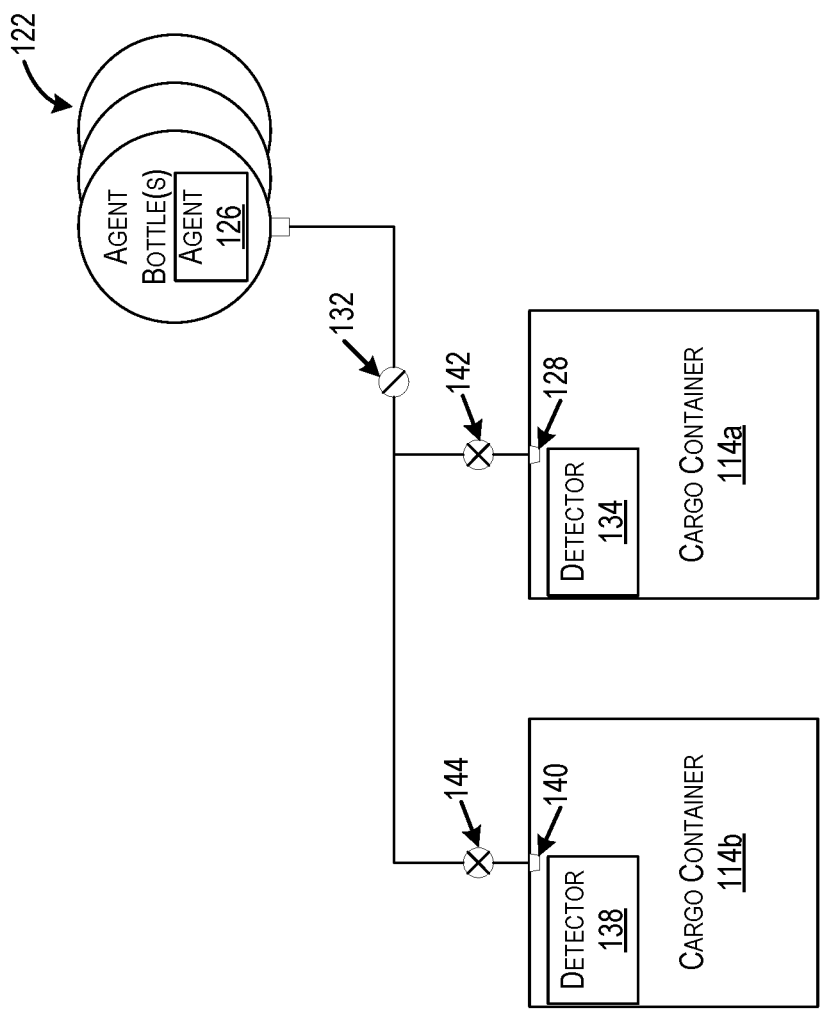
FIG. 5 illustrates a block diagram of another example of a portion of the system for suppressing a fire condition in an aircraft, according to an example implementation.

FIG. 5 illustrates a block diagram of another example of a portion of the system 120 for suppressing a fire condition in an aircraft, according to an example implementation. While FIG. 5 only illustrates a portion of the system 120, the system 120 operates similarly as described above with FIG. 3. In FIG. 5, the supply 122 of fire suppression agent is shown as a dedicated supply specifically for the cargo containers 114a-b. In this example, the supply 122 of fire suppression agent is not shared with other areas of the aircraft 100.

Figure 6:
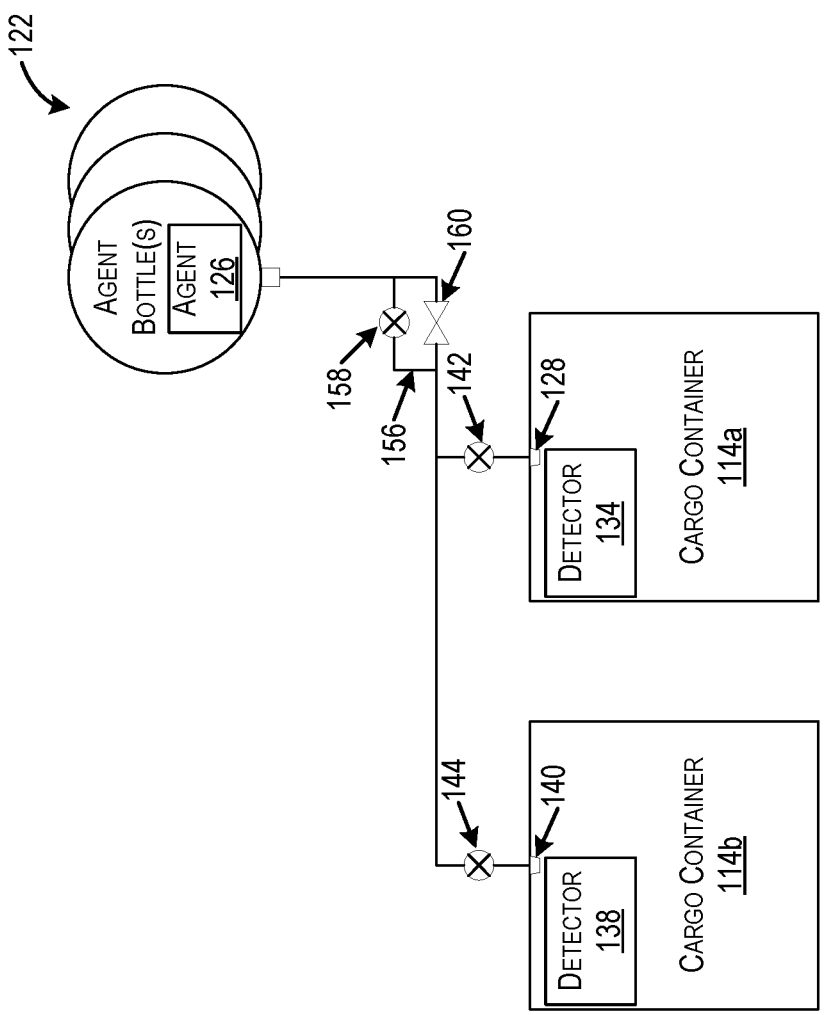
FIG. 6 illustrates a block diagram of another example of a portion of the system for suppressing a fire condition in an aircraft, according to an example implementation.

FIG. 6 illustrates a block diagram of another example of a portion of the system 120 for suppressing a fire condition in an aircraft, according to an example implementation. While FIG. 6 only illustrates a portion of the system 120, the system 120 operates similarly as described above with FIG. 4. Like FIG. 5, in FIG. 6, the supply 122 of fire suppression agent is shown as a dedicated supply specifically for the cargo container 114a and the cargo container 114b. In this example, the supply 122 of fire suppression agent is not shared with other areas of the aircraft 100, and the configuration of the system 120 with the bypass conduit 156 is shown. With the dedicated supply, also in FIG. 6, the valve 132 is not needed, and the shutoff valve 158 and restricting device 160 are used to meter the flow of the fire suppression agent 126 into the cargo container 114a.

Figure 7:
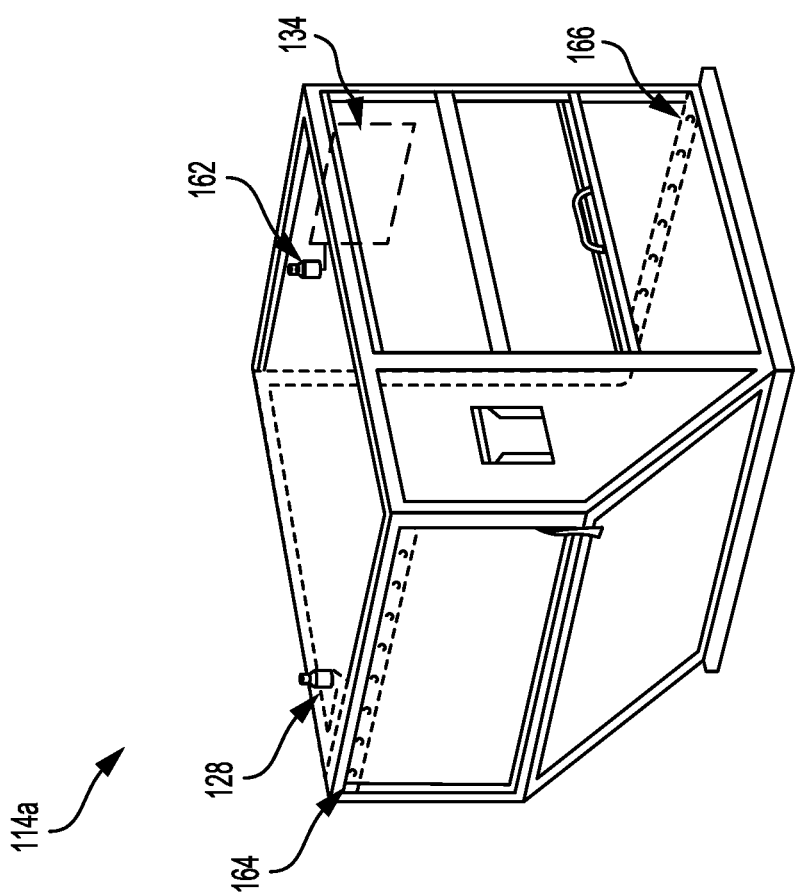
FIG. 7 illustrates an example of the cargo container, according to an example implementation.

FIG. 7 illustrates an example of the cargo container 114a, according to an example implementation. In FIG. 7, the cargo container 114a is illustrated as a unit load device (ULD). The cargo container 114a is shown with the inlet 128 that couples and connects to the conduit 124, and the detector 134 that has a separate electrical connector 162 for connecting with the computer controller 136 electrical communication line.

Also shown in FIG. 7 is internal piping for the fire suppression agent 126. Piping 164 connects to the inlet 128 for receiving the fire suppression agent 126 and distributing the fire suppression agent 126 at a top of an interior of the cargo container 114a. The piping 164 has vents or holes to enable the fire suppression agent 126 to be distributed, as shown. A second piping 166 is shown connected to the piping 164, and is located at a bottom of the cargo container 114a on an opposite side from the piping 164. In this configuration, the fire suppression agent 126 is distributed throughout the interior of the cargo container 114a.

Other configurations of internal piping in the cargo container 114a are also possible. Furthermore, in some examples, internal piping is omitted and the inlet 128 can connect to an internal spray nozzle at a top of the cargo container 114a to spray an entire internal area of the cargo container 114a. Still further, in some examples, the inlet 128 is located on a side or back wall instead of a ceiling of the cargo container 114a and piping is included to distribute the fire suppression agent 126 thoroughly inside the cargo container 114a.

FIGS. 8-9 illustrate example methods for suppressing a fire condition in an aircraft, according to example implementations. The methods shown in FIGS. 8-9 (and other flowcharts herein) present examples of methods that could be used with the aircraft 100 shown in FIG. 1, with the system 120 shown in FIG. 3, or with the computer controller 136 shown in FIG. 3, for example. Further, in some examples, devices or systems are used or configured to perform logical functions presented in FIGS. 8-9. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner. The methods shown in FIGS. 8-11 include one or more operations, functions, or actions as illustrated by one or more of blocks. Although the blocks are illustrated in a sequential order, in some examples, these blocks are performed in parallel, and/or in a different order than those described herein. Also, in some examples, the various blocks are combined into fewer blocks, divided into additional blocks, and/or removed based upon the desired implementation.

It should be understood that for this and other processes and methods disclosed herein, flowcharts show functionality and operation of one possible implementation of present examples. In this regard, in some examples, some blocks or portions of some blocks represent a module, a segment, or a portion of program code, which includes one or more instructions executable by a processor for implementing specific logical functions or steps in the process. The program code is stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium includes non-transitory computer readable medium or memory, for example, such as computer-readable media that stores data for short periods of time like register memory, processor cache and Random Access Memory (RAM). In some examples, the computer readable medium includes non-transitory media, such as secondary or persistent long term storage, like read only memory (ROM), optical or magnetic disks, and compact-disc read only memory (CD-ROM). The computer readable media may also be any other volatile or non-volatile storage systems. The computer readable medium is considered a tangible computer readable storage medium, for example.

In addition, in some examples, some blocks or portions of blocks in FIGS. 8-9, and within other processes and methods disclosed herein, represent circuitry that is wired to perform the specific logical functions in the process. Alternative implementations are included within the scope of the examples of the present disclosure in which functions are executed out of order from that shown or discussed, including substantially concurrent or in reverse order, depending on the functionality involved, as would be understood by those reasonably skilled in the art.

In FIG. 8, a method 200 includes detecting fire in the cargo container 114a by the detector 134/138 sensing temperature or smoke levels above a threshold (block 202), discharging the fire suppression agent 126 into the cargo container 114a initially at a high rate for a short period of time, e.g., 10-15 seconds through operation of the valve 132 (block 204), and varying the discharge rate of the fire suppression agent 126 to a lower rate through operation of the valve 132 (block 206).

The method 200 can optionally include depressurizing at least one compartment of the aircraft 100 (block 208). During depressurization, the cockpit depressurizes too and flight crew goes on oxygen. Unlike the cargo compartment 113, however, air is still distributed to the flight deck keeping the flight deck at slightly higher pressure than a remainder of the aircraft.

In FIG. 9, a second method 210 includes some variation in the manner in which the fire suppression agent 126 is discharged. Initially, the method 210 includes detecting fire in the cargo container 114a by the detector 134/138 sensing temperature or smoke levels above a threshold (block 202), discharging the fire suppression agent 126 into the cargo container 114a initially at a high rate for a short period of time, e.g., 10-15 seconds through operation of the valve 132 (block 204), and then closing the shutoff valve 158 to end the high rate discharge (block 210). The method 210 can optionally include depressurizing at least one compartment of the aircraft 100 (block 208).

Thus, as seen in the flowcharts in FIGS. 8-9, depressurization of one or more compartments of the aircraft 100 (or not depending on phase of flight) can be used in combination with discharge of the fire suppression agent 126. Depressurization is not needed if the aircraft 100 is already at a low altitude, such as at or below 5000 feet for example, when cabin pressure is similar to ambient air pressure. The fire suppression agent 126 can be immediately discharged first to decrease the fire in the cargo container 114a before depressurization of the aircraft 100. This is accomplished by controlling various discharge rates of the fire suppression agent 126 with different valves and feeding the fire suppression agent 126 directly into the cargo container 114a.

Some existing main deck fire suppression techniques involve depressurization of the aircraft when a fire has been detected. While a typical fire may be controlled at altitude, re-pressurization upon descent can inhibit fire control and suppression. Example methods and systems described herein can involve the discharge of the fire suppression agent 126 directly into the cargo container 114a first, with a rate of discharge regulated via flow regulating devices based on time, pressure, measured flow, and/or aircraft state. Following, depressurization of one or more compartments of the aircraft 100 can be performed, if desired.

Figure 10:
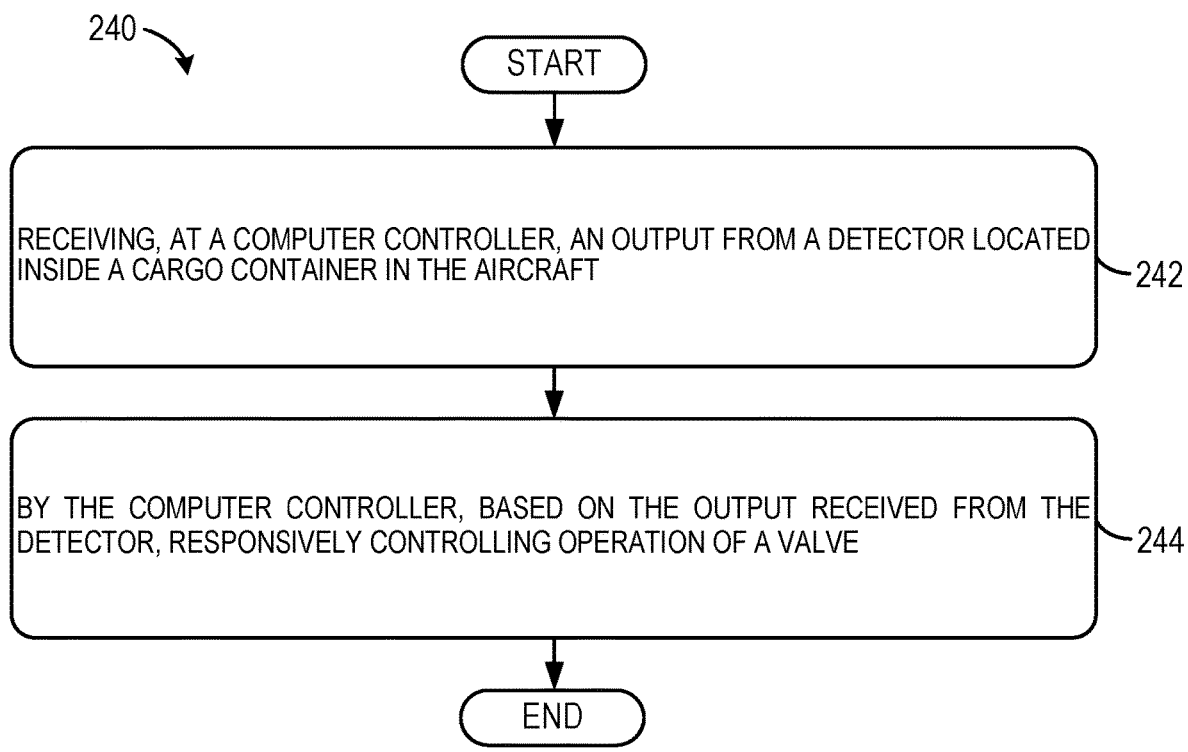
FIG. 10 shows a flowchart of another example of a method for suppressing a fire condition in an aircraft, according to an example implementation.

FIG. 10 shows a flowchart of another example of a method 240 for suppressing a fire condition in an aircraft, according to an example implementation. The method 240 describes functions performed by the computer controller 136 so as to carry out some functions described in the method 200 and the method 210 shown in FIGS. 8 and 9.

At block 242, the method 240 includes receiving, at the computer controller 136, an output from the detector 134/138 located inside the cargo containers 114a-b in the aircraft 100. The computer controller 136 processes the output from the detector 134/138 to determine whether a fire condition is present inside one of the cargo containers 114a-b, for example, as included at block 202 in FIGS. 8-9.

At block 244, the method 240 includes by the computer controller 136, based on the output received from the detector 134/138, responsively controlling operation of a valve 132, which is connected to a conduit 124 between a supply 122 of fire suppressant agent on-board the aircraft 100 and an inlet 128/140 of the cargo container, for delivery of fire suppression agent 126 through the conduit 124 to the inlet 128/140 and directly into the cargo container 114a-b.

In one example, controlling operation of the valve 132 includes controlling operation of the valve 132 to deliver a compressed gas as the fire suppression agent 126 (e.g., as included at block 204 in FIGS. 8-9).

In an example, controlling operation of the valve 132 includes controlling operation of the valve 132 to continuously discharge the fire suppression agent 126 into the cargo container 114a-b until the supply 122 of fire suppression agent is substantially empty.

In one example, the valve 132 is a variable flow valve configured to vary a discharge rate of the fire suppression agent 126, and controlling operation of the valve 132 includes controlling operation of the variable flow valve to deliver the fire suppression agent 126 at a first discharge rate for a first time period, and then to deliver the fire suppression agent 126 at a second discharge rate until the supply 122 of fire suppression agent is substantially empty (e.g., as shown at block 208 in FIGS. 8-9). The first discharge rate is greater than the second discharge rate in this example. In addition, the supply 122 of fire suppressant agent can be pressurized, and controlling operation of the variable flow valve to deliver the fire suppression agent 126 at the first discharge rate includes controlling an amount of opening of the variable flow valve to relieve pressure of the supply 122 of fire suppression agent.

In one example, the bypass conduit 156 is coupled to the supply 122 of fire suppressant agent and is configured to carry fire suppression agent 126, and the inlet 128/140 is further coupled to the bypass conduit 156, and a shutoff valve 158 is connected to the bypass conduit 156 between the supply 122 of fire suppressant agent and the inlet 128/140. With this configuration, the method 240 further includes controlling operation of the shutoff valve 158 to deliver the fire suppression agent 126 at a first discharge rate for a first time period through the bypass conduit 156, and then closing the shutoff valve 158 after the first time period (e.g., as shown at block 210 in FIGS. 8-9). In addition, where the valve 132 is a variable flow valve, the method 240 includes controlling operation of the variable flow valve to deliver the fire suppression agent 126 at a second discharge rate until the supply 122 of fire suppression agent is substantially empty, and the first discharge rate is greater than the second discharge rate.

In still another example, the method 240 also includes causing depressurization of one or more compartments of the aircraft 100 after causing delivery of the fire suppression agent 126 into the cargo container 114a-b (e.g., as shown at block 208 in FIGS. 8-9).

Figure 11:
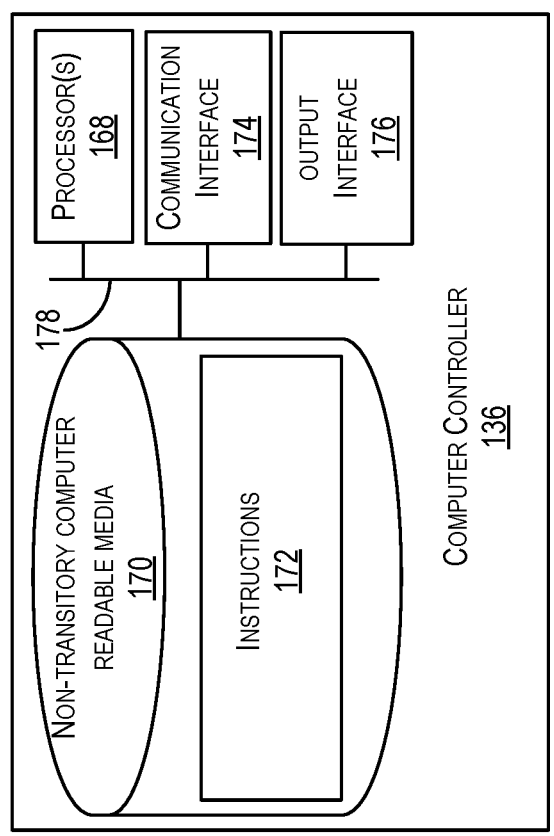
FIG. 11 illustrates a block diagram of an example of the computer controller, according to an example implementation.

As mentioned, functions of the method 240 are performed by the computer controller 136, as shown in FIGS. 3-4. FIG. 11 illustrates a block diagram of an example of the computer controller 136, according to an example implementation. The computer controller 136 includes processor(s) 168 and non-transitory computer readable media 170 storing instructions 172 executable by the processor(s) 168 to perform functions described herein. The computer controller 136 also includes a communication interface 174, an output interface 176, and each component of the computer controller 136 is connected to a communication bus 178. In some examples, the computer controller 136 also includes hardware to enable communication within the computer controller 136 and between the computer controller 136 and other devices (not shown). The hardware includes transmitters, receivers, and antennas, for example.

The communication interface 174 is a wireless interface and/or one or more wireline interfaces that allow for both short-range communication and long-range communication to one or more networks or to one or more remote devices. Such wireless interfaces provide for communication under one or more wireless communication protocols, such as, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces include, for example, an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 174 is configured to receive input data from one or more devices, and to send output data to other devices.

The non-transitory computer readable media 170 includes or takes the form of memory, such as one or more computer-readable storage media that can be read or accessed by the one or more processors 168. The computer-readable storage media can include volatile and/or non-volatile storage components, such as optical, magnetic, organic or other memory or disc storage, which can be integrated in whole or in part with the one or more processors 168. The non-transitory computer readable media 170 is considered non-transitory computer readable media. In some examples, the non-transitory computer readable media 170 can be implemented using a single physical device (e.g., one optical, magnetic, organic or other memory or disc storage unit), while in other examples, the non-transitory computer readable media 170 can be implemented using two or more physical devices.

The non-transitory computer readable media 170 thus is a computer readable medium, and the instructions 172 are stored thereon. The instructions 172 include computer executable code.

The one or more processors 168 are general-purpose processors or special purpose processors (e.g., digital signal processors, application specific integrated circuits, etc.). The one or more processors 168 receive inputs from the communication interface 174 as well as outputs from the detectors 134/138, and process the inputs to generate outputs that are stored in the non-transitory computer readable media 170. The one or more processors 168 can be configured to execute the instructions 172 (e.g., computer-readable program instructions) that are stored in the non-transitory computer readable media 170 and are executable to provide the functionality of the computer controller 136 described herein.

The output interface 176 outputs information for reporting or storage, and thus, the output interface 176 is similar to the communication interface 174 and can be a wireless interface (e.g., transmitter) or a wired interface as well.

In another example, the computer controller 136 takes the form of an electromechanical device or devices, such as relays and switches, rather than a controller executing software. In an example operation of the computer controller 136 in the form of electromechanical devices, when a fire condition is present, the detectors 134/138 provide a ground signal received by relays of the computer controller 136 to drive the relays and trigger discharge of the agent 126 from the supply 122. The ground signal further drives operation of the valve 132 to a first position resulting in a high rate of discharge. Another time delay relay is used to drive operation of the valve 132 to a second position resulting in a low rate of discharge after a predetermined time period. An electromechanical device implementation for the computer controller 136 is useful to provide alternatives to retrofit aircraft that are already in service.

Note that although this disclosure has described use of the methods and systems for use on aircraft, many of the same functions can apply equally to use of the methods and system on board any type of vehicle in order to suppress fire conditions (such as within automobiles, boats, etc.). The methods and systems can also find use within non-vehicles or stationary areas, for example. Moreover, the methods and systems can be implemented in any area used for storage to enhance safety, including other vehicles and structures.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for suppressing a fire condition in an aircraft, the system comprising:
   a supply of fire suppressant agent on-board the aircraft;
   a conduit coupled to the supply of fire suppressant agent and configured to carry fire suppression agent;
   a cargo container in a cargo compartment of the aircraft, the cargo container including piping inside the cargo container for receiving the fire suppression agent and distributing the fire suppression agent inside the cargo container;
   an inlet located downstream of the conduit, wherein the inlet is coupled to the conduit and wherein the inlet is attached to the piping of the cargo container in the aircraft to deliver the fire suppression agent directly into the cargo container;
   a valve connected to the conduit between the supply of fire suppressant agent and the inlet;
   a detector located inside the cargo container; and
   a computer controller in communication with the valve and in communication with the detector, and controlling operation of the valve for delivery of the fire suppression agent into the cargo container based on an output received from the detector.

2. The system of claim 1, wherein the computer controller controls operation of the valve to provide a continuous discharge of the fire suppression agent into the cargo container until the supply of fire suppression agent is substantially empty.

3. The system of claim 1, wherein the valve is a shutoff valve configured to stop delivery of the fire suppression agent through the conduit.

4. The system of claim 1, wherein the valve is a variable flow valve configured to vary a discharge rate of the fire suppression agent.

5. The system of claim 4, wherein the supply of fire suppressant agent is pressurized, and wherein the discharge rate is based on an amount of opening of the variable flow valve to relieve pressure of the supply of fire suppression agent.

6. The system of claim 4, wherein the computer controller controls operation of the variable flow valve to provide delivery of the fire suppression agent at a first discharge rate for a first time period, and then to provide delivery of the fire suppression agent at a second discharge rate until the supply of fire suppression agent is substantially empty, wherein the first discharge rate is greater than the second discharge rate.

7. The system of claim 1, wherein the valve is a variable flow valve configured to vary a discharge rate of the fire suppression agent, and the system further comprises:
   a bypass conduit coupled to the supply of fire suppressant agent and configured to carry the fire suppression agent, wherein the inlet is further coupled to the bypass conduit; and
   a shutoff valve connected to the bypass conduit between the supply of fire suppressant agent and the inlet.

8. The system of claim 7, wherein the system further comprises a restricting device to meter flow of the fire suppression agent through the conduit, and wherein the computer controller controls operation of the shutoff valve to provide delivery of the fire suppression agent at a first discharge rate for a first time period through the bypass conduit based also on restriction of flow through the conduit due to the restricting device, and then closes the shutoff valve after the first time period.

9. The system of claim 8, wherein the computer controller controls operation of the variable flow valve to provide delivery of the fire suppression agent at a second discharge rate until the supply of fire suppression agent is substantially empty,
   wherein the first discharge rate is greater than the second discharge rate.

10. The system of claim 1, wherein the fire suppression agent is a compressed gas.

11. The system of claim 1, wherein the computer controller is a first computer controller, and the system further comprising:
    a second computer controller for causing depressurization of one or more compartments of the aircraft after the first computer controller causes delivery of the fire suppression agent into the cargo container.

12. A method for suppressing a fire condition in an aircraft, the method comprising:
    receiving, at a computer controller, an output from a detector located inside a cargo container in a cargo compartment in the aircraft; and
    by the computer controller, based on the output received from the detector, responsively controlling operation of a valve, which is connected to a conduit between a supply of fire suppressant agent on-board the aircraft and an inlet of the cargo container, for delivery of fire suppression agent through the conduit to the inlet and directly into the cargo container, wherein the cargo container includes piping inside the cargo container for receiving the fire suppression agent and distributing the fire suppression agent inside the cargo container and the inlet is attached to the piping of the cargo container in the aircraft to deliver the fire suppression agent directly into the cargo container.

13. The method of claim 12, wherein controlling operation of the valve comprises controlling operation of the valve to continuously discharge the fire suppression agent into the cargo container until the supply of fire suppression agent is substantially empty.

14. The method of claim 12, wherein the valve is a variable flow valve configured to vary a discharge rate of the fire suppression agent, and wherein controlling operation of the valve comprises controlling operation of the variable flow valve to deliver the fire suppression agent at a first discharge rate for a first time period, and then to deliver the fire suppression agent at a second discharge rate until the supply of fire suppression agent is substantially empty, wherein the first discharge rate is greater than the second discharge rate.

15. The method of claim 14, wherein the supply of fire suppressant agent is pressurized, and wherein controlling operation of the variable flow valve to deliver the fire suppression agent at the first discharge rate comprises controlling an amount of opening of the variable flow valve to relieve pressure of the supply of fire suppression agent.

16. The method of claim 12, wherein a bypass conduit is coupled to the supply of fire suppressant agent and is configured to carry fire suppression agent, wherein the inlet is further coupled to the bypass conduit, and a shutoff valve is connected to the bypass conduit between the supply of fire suppressant agent and the inlet, wherein the system further comprises a restricting device to meter flow of the fire suppression agent through the conduit, and the method further comprises:
controlling operation of the shutoff valve to deliver the fire suppression agent at a first discharge rate for a first time period through the bypass conduit based also on restriction of flow through the conduit due to the restricting device, and then closing the shutoff valve after the first time period.

17. The method of claim 16, wherein the valve is a variable flow valve, and the method further comprises controlling operation of the variable flow valve to deliver the fire suppression agent at a second discharge rate until the supply of fire suppression agent is substantially empty, wherein the first discharge rate is greater than the second discharge rate.

18. The method of claim 12, wherein controlling operation of the valve comprises controlling operation of the valve to deliver a compressed gas as the fire suppression agent.

19. The method of claim 12, further comprising:
causing depressurization of one or more compartments of the aircraft after causing delivery of the fire suppression agent into the cargo container.

20. An aircraft comprising:
a cargo compartment; and
a cargo container in the cargo compartment of the aircraft, the cargo container including piping inside the cargo container for receiving the fire suppression agent and distributing the fire suppression agent inside the cargo container;
a system associated with the cargo compartment, the system comprising:
a supply of fire suppressant agent;
a conduit coupled to the supply of fire suppressant agent and configured to carry fire suppression agent;
an inlet located downstream of the conduit, wherein the inlet is coupled to the conduit and wherein the inlet is attached to the piping of the cargo container in the aircraft to deliver the fire suppression agent directly into the cargo container;
a valve connected to the conduit between the supply of fire suppressant agent and the inlet;
a detector located inside the cargo container; and
a computer controller in communication with the valve and in communication with the detector, and controlling operation of the valve for delivery of the fire suppression agent into the cargo container based on an output received from the detector.

\* \* \* \* \*